July 25, 1950 — G. T. DIDERRICH — 2,516,759
FISH ROD HOLDER OR CARRIER
Filed Sept. 15, 1947 — 2 Sheets-Sheet 2
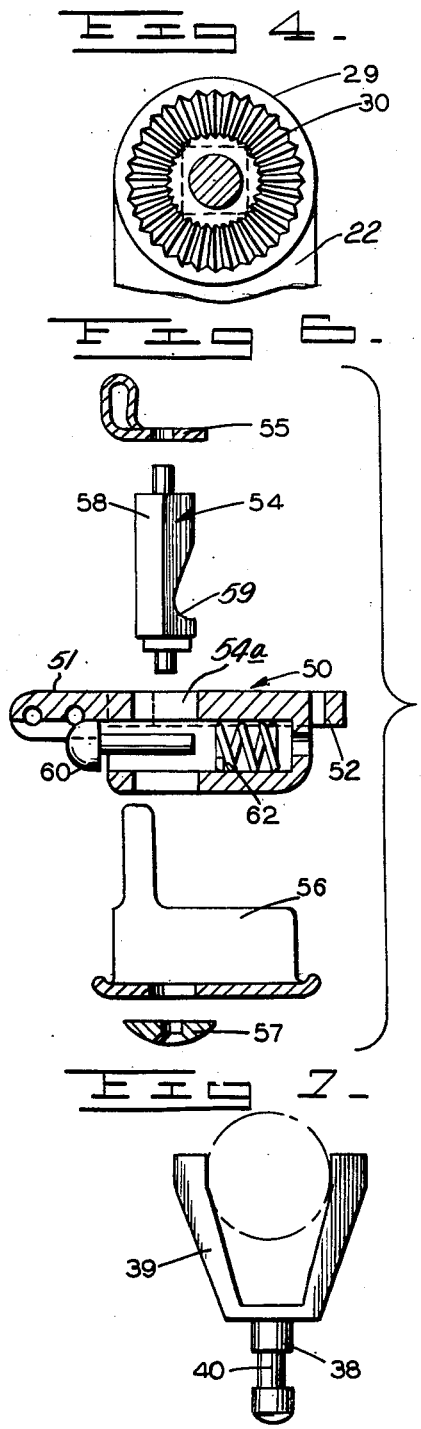
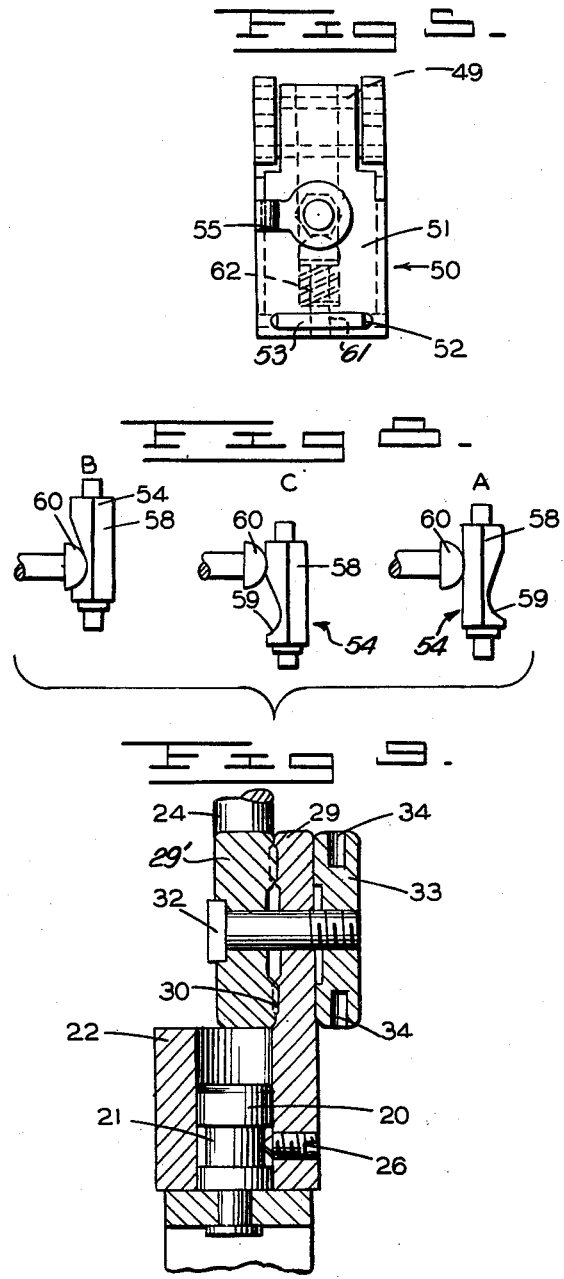
INVENTOR.
GEORGE T. DIDERRICH
BY
ATTORNEY Patented July 25, 1950

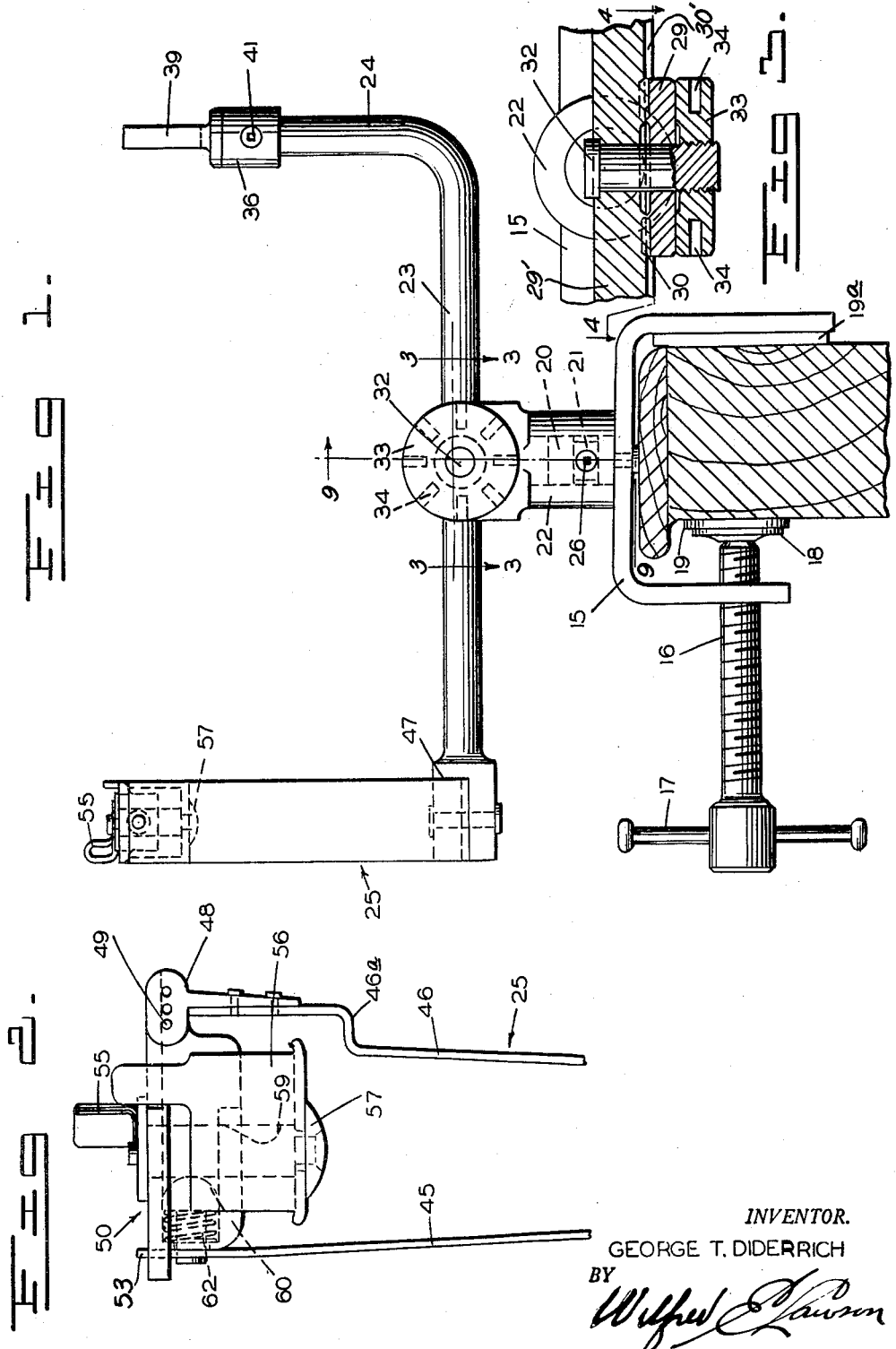

2,516,759

UNITED STATES PATENT OFFICE 2,516,759

FISH ROD HOLDER OR CARRIER

George T. Diderrich, Milwaukee, Wis.

Application September 15, 1947, Serial No. 774,126

3 Claims. (Cl. 248—42)

This invention relates to a fish rod holder or carrier suitable for mounting on a gunwale or the like and provided with a special latch thereon for firmly securing said rod or fish pole.

This carrier is provided with means for accurately and finely adjusting the inclination of the fish rod both in vertical and in horizontal planes, which is not possible with similar known apparatus.

One advantage of this holder is for instance that, after the line has been cast, the rod locked on top of the holder and the vertical adjusting means released, it will be possible for the fisherman to incline the rod by hand in a vertical plane as he desires. On the other hand, he may swing the fish rod in a circle horizontally, having then only to attend to the reeling-in or out of the fish line.

These and other objects and advantages will be made clear from the subjoined description with the aid of the drawings.

Like numerals refer to the same details in the different views.

One embodiment of the invention is illustrated in the drawings, and

Figure 1 is an assembly view of the holder in side elevation with the parts in horizontal position;

Figure 2 is an elevation view of the upper part of the inner end of the holder;

Figure 3 is a fragmentary, horizontal section taken substantially on line 3—3 of Figure 1;

Figure 4 is a fragmentary section as seen from line 4—4 of Figure 3, showing radial teeth for setting the rod in vertical inclination;

Figure 5 is a top plan view of the "top lock" as installed on the inner arm of the main frame;

Figure 6 is an exploded view of the details of the top lock seen in side elevation.

Figure 7 is a front elevation of a yoke swiveled on the inner arm of the frame for supporting the fish rod;

Figure 8 shows the locking shaft for the "top lock" in three different positions of engagement;

Figure 9 is a vertical section taken substantially on the line 9—9 of Figure 1.

In the drawings, reference numeral 15 denotes a U-shaped bracket or clevis with clamp screw 16 and handle 17 adapted for firmly securing the holder to the gunwale of a boat. The clamp screw 16 is provided with a swivel washer 18 carrying a rubber pad 19 which bears against the inner side of the boat gunwale, the pad preventing injury to the wood work of the boat and the inside of the clevis is similarly padded at 19a for the same purpose.

On top of the clevis 15 is rigidly secured, as by riveting or welding, a central pivot 20 having a circumferential groove 21 midway between its ends.

This pivot 20 is intended to engage in a socket 22, which projects downwardly from the center portion of the frame or bar 23 about midway between its ends. This frame is provided with an upstanding arm 24 at its outer end and a likewise upstanding inner arm 25, on which the fish rod or fish pole is supported and locked.

The socket 22 fits over said pivot 20 to turn easily in a horizontal plane and is held down by a set screw 26 engaging in said circumferential groove 21 to prevent the socket from coming off accidentally, and also, if tightened sufficiently, to lock the arm against turning.

The upper part of the socket 22 is shaped like a disk 29 with two flat vertical surfaces, the inner one of which is provided with serrations or radial teeth 30 intended for locking with similar teeth 30' on the circular disk portion 29' in the center of the bar or frame 23 and around which center the frame is intended to rock. For this purpose a lock bolt 32 is secured against rotation in a central hole of the disk 29, by a square head or the like, countersunk in the outer surface of frame disk position 29'. The central hole for the lock bolt 32 runs thru the disk portion 29' of the frame 23 as well as thru the adjustment retainer nut 33, which is threaded on the end of bolt 32 and is provided with radial sockets 34 for tightening the retainer nut 33 on the bolt and thereby to securely lock the bar 23 in adjusted position.

The arm 24 at the inner end of the bar or frame 23 forms a continuation of the bar itself by being bent up in elbow shape and terminating in a head 36 which is drilled vertically to receive the shank 38 of a swivel yoke 39 of V-form, between the fingers of which is received a fish pole, to rest between. The shank 38 is recessed circumferentially as at 40, for engagement with a set screw 41 in order to retain the yoke in said head 36, while permitting it to turn around therein.

This swivel yoke 39 is intended to be used for large, heavy fish rods and is exchangeable with a smaller yoke, similarly constructed, but of smaller proportions, so as to fit the head 36 and provided with a smaller V-opening.

The inner vertical arm 25 is made of flat metal band, bent in U-shape with two upright side walls 45, 46, which serve as a handle and a flat bottomed end fitting snugly in a flat seat 47 formed at the inner end of the bar 23.

The side wall 45 is straight, while the other wall 46, is bent out, and has an offset or knee 46a near its upper end, to which is riveted a hinge leaf 48 with one or more holes for a hinge pin 49 to adjustably position the lock proper 50. The latter has a flat top 51 with a transverse slot 52 at the end opposite the hinge, and in which a tongue 53 on side wall 45 is intended to fit, when the lock is closed.

A locking spindle 54 engages in a hole 54a of the lock proper, and has riveted to its top end an operating finger 55 resting on the flat top 51. The spindle 54, which extends thru the hole 54a in the lock proper 50, engages, at its lower end, with a shell 56, which is secured thereto by a washer 57, riveted to the spindle 54. The spindle 54 is of hexagonal cross-section at 58. This spindle 54 has a recess or notch 59 on one flat side, which is deep at the lower end and diminishes gradually towards the upper end.

With this notch 59, a latch button 60 cooperates to lock the member 50, permitting turning of the spindle 54 from the locking position as shown at A in Figure 8 to the unlocked position shown at B.

This change is made by a light push upwards on the spindle 54, when the spring 62 around the latch button 60 withdraws the latter from the hole 61 in the handle wall 45. For positive locking, the lock finger 55 is given a half turn clockwise, against a permanent stop, as in position A of Figure 8.

It is to be understood that the invention as herein disclosed may be varied from the details described and shown without departure from the spirit of the subjoined claims.

I claim:

1. A fishing rod holder, comprising a base portion adapted to be secured to a supporting body such as the gunwale of a boat, a relatively long base member pivotally attached intermediate its ends to said base portion for swinging movement on a horizontal and a vertical plane, said member having an upstanding arm at one end, a rest upon the upper end of the arm adapted to receive the fishing rod, and means at the opposite end of said member for yieldingly clamping the handle of the fishing rod and comprising an upright substantially U-shaped element having a bottom part and upwardly extending side parts, said side parts being in the form of relatively thin resilient bands of metal and a lock member connecting the upper ends of said arms, said lock member comprising a flat plate pivotally secured at one end to the upper end of one of the arms, a spring retracted bolt carried by the plate, the other one of the arms being provided with an aperture to receive an end of the bolt, and a reciprocable pin carried by the plate and having a camming face engaging the opposite end of the bolt to effect movement of the bolts against the resistance of said spring.

2. A fishing rod holder of the character described in claim 1, wherein the said plate has a slot adjacent to the end remote from the pivoted end thereof and the upper end of the said other one of the arms being formed for extension through said slot.

3. A fishing rod holder of the character described in claim 1, wherein the said reciprocable member is supported for rotation on its long axis and has a flat surface remote from said camming means for engagement by the said other end of the bolt to maintain the bolt projected against the tension of said spring.

GEORGE T. DIDERRICH.

REFERENCES CITED

The following references are of record in the file of this patent:

UNITED STATES PATENTS

| Number | Name | Date |
|---|---|---|
| 1,104,352 | Erlandsson | July 21, 1914 |
| 1,735,212 | Pawsat | Nov. 12, 1929 |
| 2,184,583 | Danko | Dec. 26, 1939 |
| 2,220,234 | Hadaway | Nov. 5, 1940 |
| 2,341,065 | White | Feb. 8, 1944 |